Patented Nov. 13, 1928.

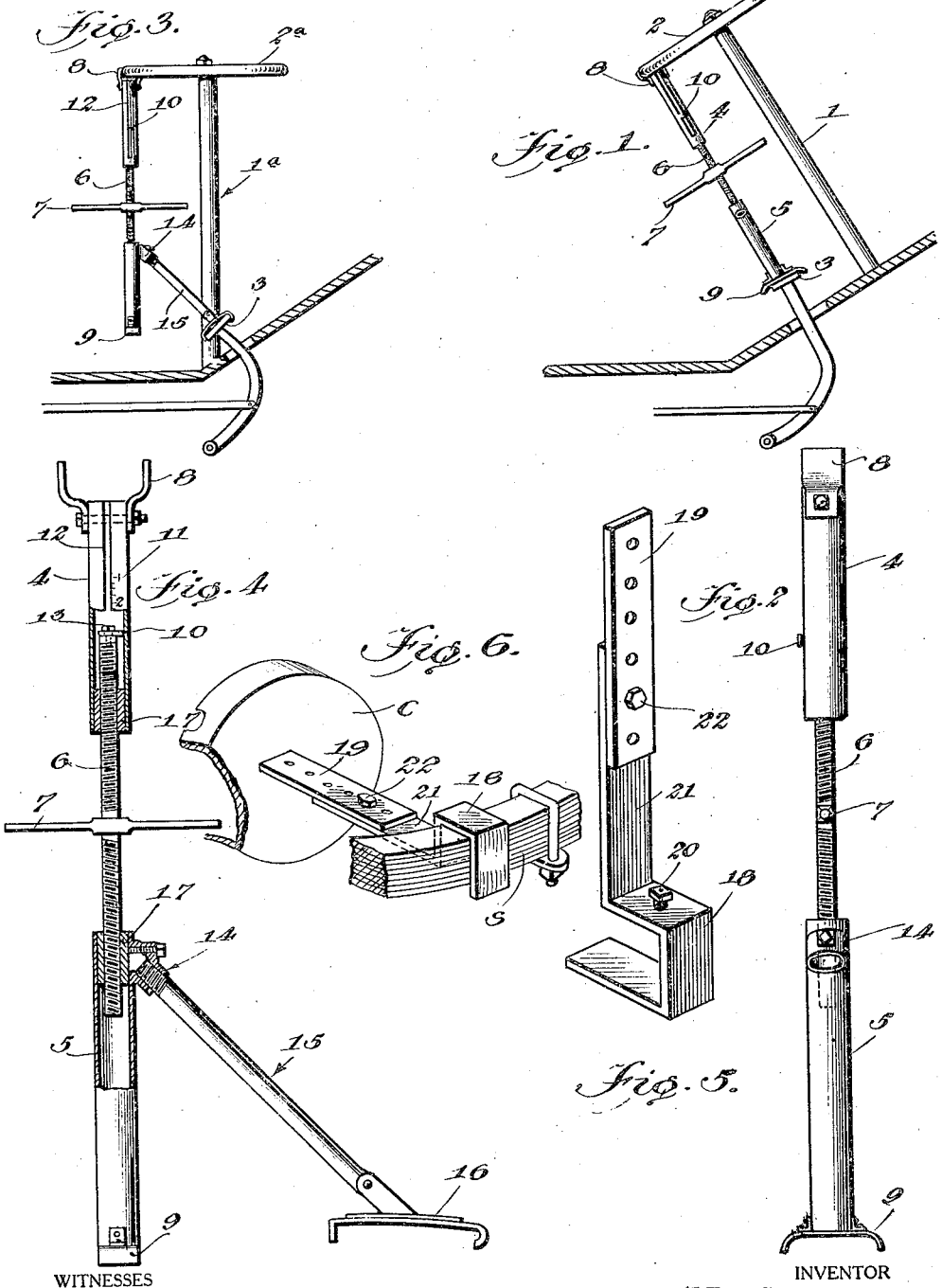

1,691,822

UNITED STATES PATENT OFFICE.

LOUIS W. LINDMEYER, OF BUTTE, MONTANA.

PEDAL HOLDER.

Application filed October 17, 1925. Serial No. 63,154.

This invention relates to improvements in pedal holders, and it consists of the constructions, combinations, and arrangements herein described and claimed.

An object of the invention is to provide a tool adapted particularly for use in automobile shops, garages, and the like, for the purpose of holding either the clutch or brake pedal in the depressed position so that such adjustment as can be made only with said pedals in the depressed positions, will be facilitated.

Other objects and advantages of the invention will appear in the following specification, references being had to the accompanying drawings, in which—

Fig. 1 is a side elevation showing the tool in use upon a pedal, the automobile floor being shown in section, Fig. 2 is a detail side elevation of the tool, the tube being slightly turned in relation to the expanding screw.

Fig. 3 is a view similar to Fig. 1 illustrating the use of a pedal extension when the tool is employed in connection with a vertical type steering hood.

Fig. 4 is a sectional view of the tool in Fig. 3, partly shown in elevation,

Fig. 5 is a detail perspective view of one of a pair of brackets to be used in conjunction with the tool, as more fully described below.

Fig. 6 is a detail perspective view illustrating the use of one of said brackets in holding the adjacent front wheel rigidly during brake and clutch adjustments.

As already briefly stated, the tool is intended for use in automobile garages, particularly for the purpose of holding either a brake or clutch pedal in the depressed position while adjustments are being made. Ordinarily, it requires a man to sit in the seat and push down on the pedal while another man makes the necessary adjustments. This arrangement has the disadvantage that a slight relaxation of the pressure upon the pedal throws the adjustment out, making the work of the man who does the adjusting uncertain to an extent. The improved tool makes it possible to hold the pedal down to any degree of pressure while one man does the adjusting.

In Fig. 1, the steering clounm 1 is of the inclined type, the steering wheel 2 being inclined in respect to the operator as a result. The pedal 3 is the brake pedal but, so far as the invention is concerned, might also be the clutch pedal.

The tool as used in Fig. 1 consists of upper and lower tubes 4 and 5, which are separated or contracted in respect to each other by means of a right and left expanding screw 6. The screw has a handle 7 by which it is conveniently turned. Stirrups 8 and 9 at the top and bottom of the respective tubes engage a portion of the steering wheel 2 and the pedal 3 as shown.

Upon turning the expanding screw 6 in the proper direction, the tubes 4 and 5 are made to push against the hand wheel and the brake pedal. The result is that the brake pedal is depressed and is held depressed until the pressure is relieved by reverse turning of the screw. In order that the operator may have some sort of a guide designating various degrees of depression of the pedal, the upper tube 4 is provided with a pointer 10 which travels over the numbered calibrations 11 at one side of the slot 12 in which the main shank of the pointer rides. The pointer has a suitable swivel mounting at 13 upon the upper end of the screw 6.

In Fig. 3 the steering column $1^a$ is of the vertical type. The steering wheel $2^a$ occupies the horizontal plane. The brake pedal 3 is therefore in a different relationship to the steering wheel and it is not so convenient to apply the tool as in Fig. 1. However, in order that the tool may be applied, the lower tube 5 is provided with a lateral socket 14 into which the pedal extension 15 is screwed (Fig. 4). The pedal extension has a stirrup 16 which fits the top of the brake pedal. The original stirrup 9 serves no purpose when the pedal extension 15 is employed. Fig. 4 illustrates the use of bushings 17 in adjoining ends of the tubes in which the expanding screw operates. These bushings are used in all forms of the tool, but it is optional whether the tubes are internally threaded to take the ends of the screw.

Fig. 5 illustrates a novel, convenient, and necessary adjunct which may be used in conjunction with the main tool, particularly under circumstances and conditions requiring the adjustment of four-wheel brakes. The bracket is used in pairs, and the brackets are employed particularly for holding the front wheels of the automobile. The bracket is shaped into a hook at 18 so that it may straddle the adjacent spring S of the automobile. An extension 19 of the arm 21 is intended to contact the brake casing C (Fig. 6) and thereby hold such casing together with the front wheel rigidly against turning sidewise when jacked up and running free from the weight of the vehicle. All lost motion or play of the steering wheel or front wheels is stopped when a pair of the brackets is applied as stated. The extension 19 is adjustable by means of a bolt 22 which is insertable in any one of a plurality of appropriately located holes. A set-screw 20, carried by the hook 18, is intended to bind against the adjacent edge of the spring to hold the brackets in place.

The operation is readily understood. In most forms of automobile construction, the brake pedal 3 is almost directly in line with the lower part of the steering wheel 2, (Fig. 1), and the tool is therefore capable of being inserted in the intervening space so as to make direct contact with each. Having fixed the tool in position the handle is turned in the appropriate direction so that the upper and lower tubes 4 and 5 are separated. The steering wheel 2 acts as a fixture and the brake pedal 3 is depressed as much as desired. The pointer 10 and scale 11 (Fig. 4) provides the operator with an index, giving him some idea as to how much he is depressing the pedal. He may now proceed with his brake (or clutch) adjustments.

In Fig. 3 the brake pedal 3 is rather far out of line with the lower part of the steering wheel 2ᵃ, and use is therefore made of the lateral socket 14 and pedal extension 15. The pedal extension is a perfectly rigid member upon the lower tube 5 and turning of the screw 6 by means of the handle 7 will cause depression of the pedal 3 substantially in the same manner as was done in Fig. 1.

While the construction and arrangement of the improved pedal holder is that of a generally preferred form, obviously modifications and changes may be made without departing from the spirit of the invention or the scope of the claims.

I claim:—

1. A device of the character described comprising a pair of tubes each having an internally threaded bushing, a turnable right and left threaded screw engaging the bushing and disposing the tubes in axial alignment for use between a pedal and the steering wheel of an angularly disposed steering column, a socket forming part of one of the tubes and extending therefrom laterally, and an extension fitted in the socket being disposed at an angle to the axis of said tubes to reach a pedal and the steering wheel of a vertically disposed steering column.

2. A pedal holder comprising a turnbuckle screw having oppositely threaded ends engaging axially aligned tubular members, to which are attached oppositely facing wheel rim and pedal embracing stirrups, one of said stirrups being axially alined with and attached to the end of one tubular member and the other of said stirrups being laterally offset from the other of said tubular members at an angle thereto.

LOUIS W. LINDMEYER.